Jan. 3, 1933.    B. C. THORNBURGH    1,892,816
BRAKE LINING ANCHORAGE AND ARTICLE
Filed Feb. 21, 1931    2 Sheets-Sheet 1
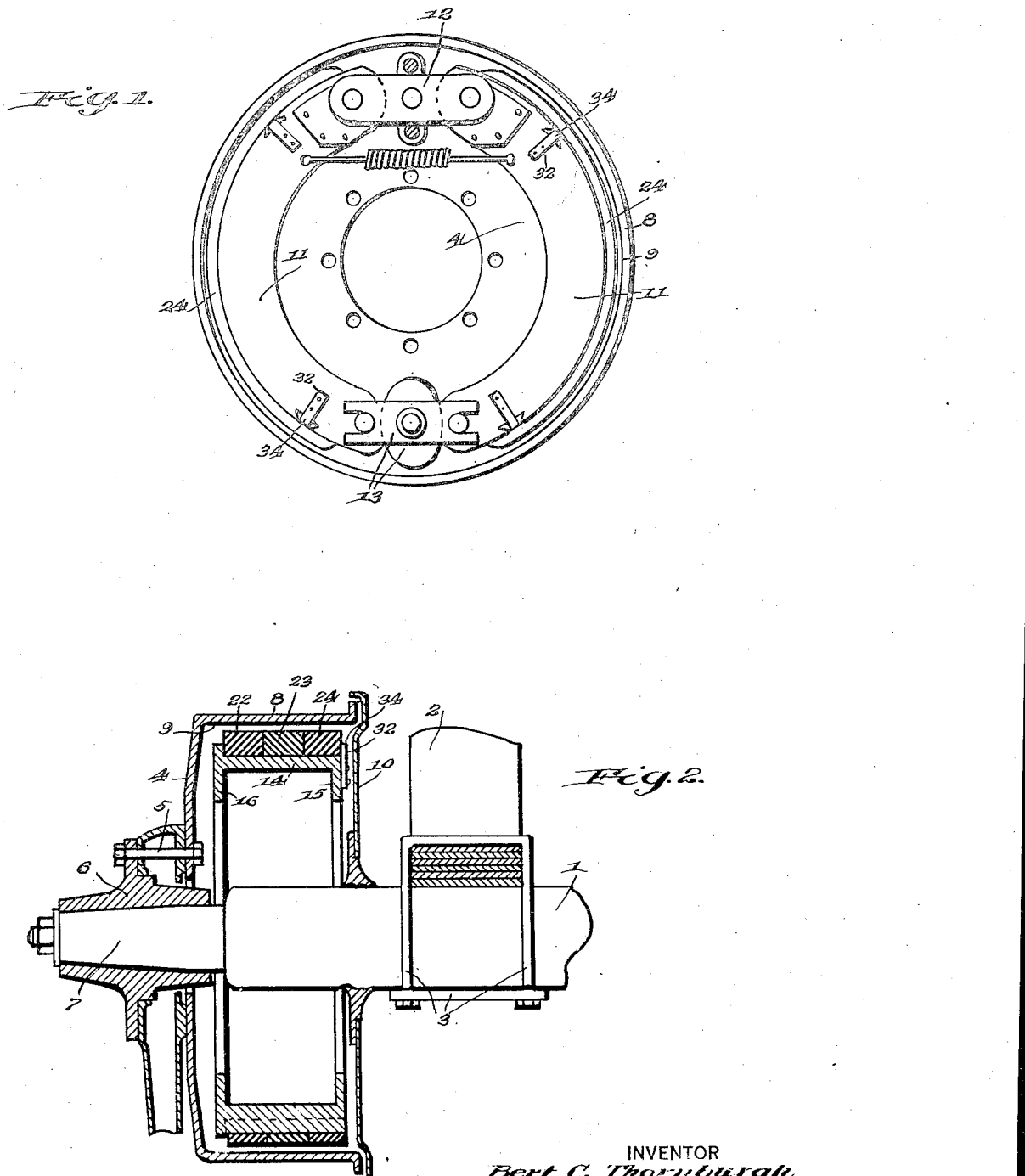
INVENTOR
Bert C. Thornburgh
BY
Carl H. Crawford
ATTORNEY

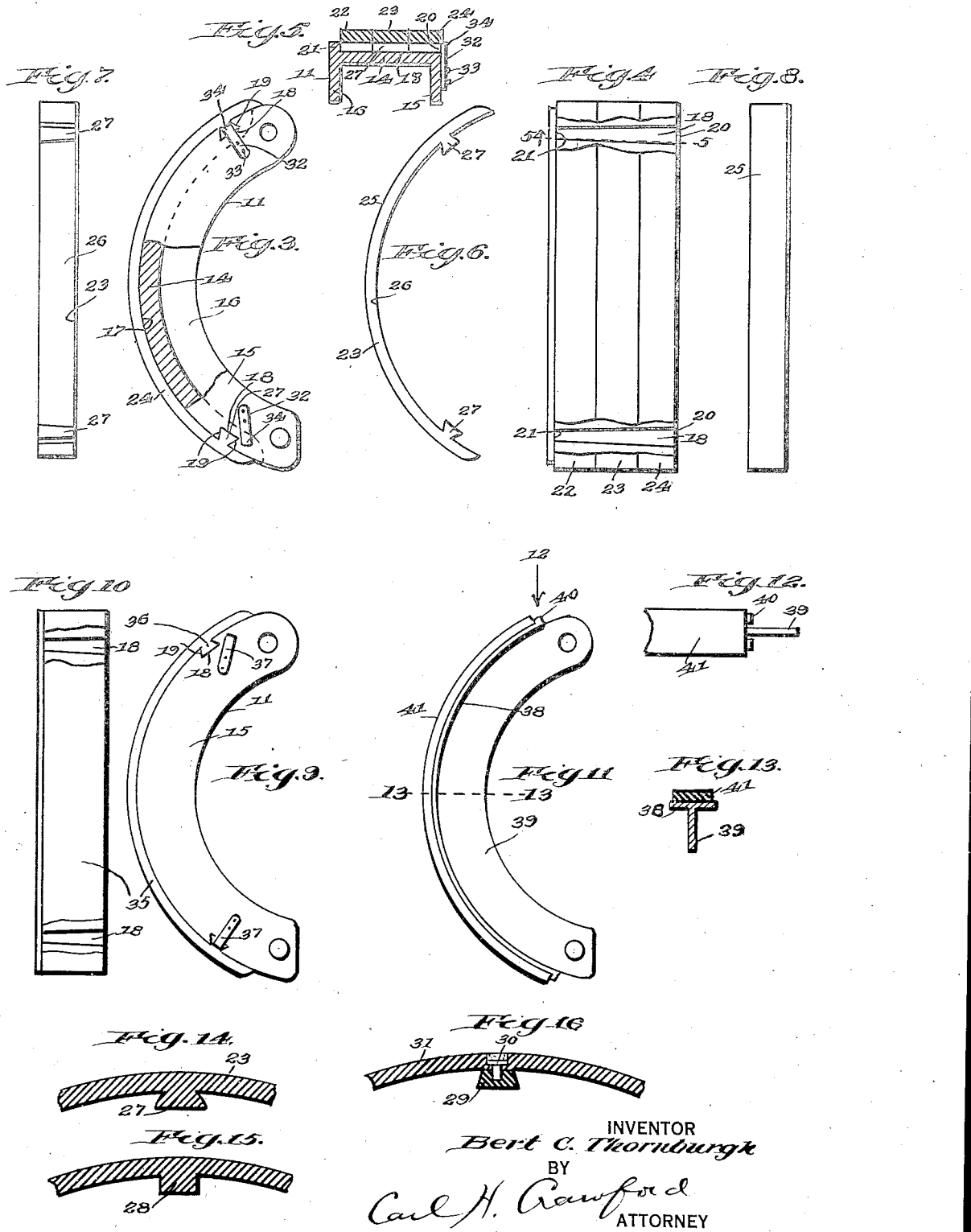

Patented Jan. 3, 1933

1,892,816

UNITED STATES PATENT OFFICE

BERT C. THORNBURGH, OF YAKIMA, WASHINGTON

BRAKE LINING ANCHORAGE AND ARTICLE

Application filed February 21, 1931. Serial No. 517,485.

This invention relates to improvements in brake mechanism for vehicles and one of the objects is to provide a novel combination of brake drum, shoe and lining, and a further object is to provide as articles of manufacture, a novel form of brake shoe and lining, and finally, a novel form of brake lining.

The invention is particularly designed and intended for use in an internal expanding brake in which the brake lining is of the cast type and to all intents and purposes entirely rigid.

In this type of brake, it is a feature of this invention to equip the shoe and lining in a novel manner so that the latter can be effectively anchored to the former without the use of metallic means such as rivets, or in fact, any other means in addition to the equipment with which the shoe and lining of this invention is provided.

A further object of the invention is to provide a novel means for anchoring the lining to the shoe in such a manner that when the lining is disposed in a final position of anchorage there will not only be a tight connection between the two, but such connection will be a structural connection, and the structure employed for such connection will consist in part of the shoe and in part of the lining.

A further feature consists in making such anchorage connection in such a manner that when the connection is reduced or slightly loosened, the shoe may readily be removed entirely from the lining, or vice versa.

It is a further feature of the invention to provide a novel form of anchorage of the lining with the shoe such as will permit of the lining being shifted laterally with respect to the shoe in order to disconnect the former from the latter.

A further feature consists in a form of anchorage in which either an ordinary or an extra large size lining may be removed from the shoe without disassembling either the shoe or taking off the wheel of the vehicle.

In the event that this novel type of lining is applied to large size vehicles employing very wide brakes, it is a feature of the invention to make the lining in sections so that the lining may be removed without disassembly of the shoes or wheel, even though clearance between the drum and the vehicle spring is too slight for removal of an integral lining.

The invention has many other objects and features which will be more fully described in connection with the accompanying drawings and which will be more particularly pointed out in and by the appended claims.

In the drawings:—

Fig. 1 is an inside view of a brake drum showing the internally disposed expanding shoes and brake linings equipped with one form of the device of my invention.

Fig. 2 is a vertical sectional view of the brake drum of a large size vehicle showing the relatively slight clearance between the spring and the brake drum.

Fig. 3 is a view in side elevation of one of the brake shoes detached from the assembly shown in Figs. 1 and 2.

Fig. 4 is a face view thereof showing a sectional lining and looking from the left of Fig. 3.

Fig. 5 is a sectional view on line 5—5 of Fig. 4.

Fig. 6 is a view in side elevation of the lining detached from the shoe.

Fig. 7 is a view of one section of the lining shown in Fig. 6, and looking from the right of the latter.

Fig. 8 is a face view of a section of the lining looking from the left of Fig. 6.

Fig. 9 is a view in side elevation of a brake shoe equipped with a single brake lining section.

Fig. 10 is a face view looking from the left of Fig. 9.

Fig. 11 is a view in side elevation of a touring car brake shoe showing the manner in which the latter may be equipped with the device of this invention.

Fig. 12 is a view looking in the direction of arrow 12 of Fig. 11.

Fig. 13 is a sectional view on line 13—13 of Fig. 11.

Fig. 14 is an enlarged longitudinal sectional view of the preferred form of brake lining, with the anchorage bar formed integral with the lining, in which the bar is shown to be wedge shaped or trapezoidal.

Fig. 15 is a similar view of the lining with a modified form of bar whose faces are rectangular and formed integral with the section.

Fig. 16 is a similar sectional view in which the bar is shown formed separate from and attached to the lining section.

Like characters of reference designate similar parts throughout the different figures of the drawings.

As the device of this invention is not limited in its application to any particular type of braking mechanism, either front or rear, and as the invention is not addressed to any particular type of shoe operating means, the illustration has been restricted to the most conventional showing of structure that forms no part of the invention and such structure will only be very generally referred to and described.

Therefore, referring to Figs. 1 and 2, 1 designates the rear axle housing of a large size truck vehicle and I have generally indicated one of the suspension springs at 2, the same being secured to the housing by anchorage means 3. A brake drum is shown having an outside wall 4 which is secured by means such as bolts 5, with a wheel hub structure 6, that is mounted on axle section 7. The brake drum has a cylindrical portion 8, having an inner braking face 9, against which the brake lining of shoes is adapted to be expanded to apply braking stress to the wheels, as is well known. A dust guard 10 is shown disposed in the usual manner.

By reference to Fig. 2, it will be seen that there is a relatively slight clearance between the right hand side of the brake drum and the spring 2, a fact which will be later referred to in the following description of the invention.

In Fig. 1, I have shown two shoes of like construction indicated at 11, the same being suitably hung by means indicated at 12, in any preferred manner, and expanded by mechanism indicated generally at 13, to force the linings of the shoes against the inner face 9, to apply braking stress, it being understood that this invention is primarily addressed to an internal expanding brake.

Reference will next be made to Figs. 3 to 8, in which I have shown one of the shoes and the lining therefor in detail to illustrate what more properly constitutes the real invention In this particular instance, I have shown a shoe having an arcuate web 14 and inwardly projecting flanges 15 and 16. The periphery 17, of web 14, forms the face against which the brake lining is disposed, and it will be understood that I am now describing that form of the invention which is adapted for large size vehicles, as illustrated in Fig. 2. The outer or peripheral face 17 is continuously smooth and unbroken except for anchorage portions which I will now describe.

At suitable location, preferably near but inside the ends of the lining, to be presently described, I provide the shoe with two or more anchorage portions which, in the present construction are in the form of grooves. Preferably, and as shown, said grooves are dove-tailed in cross section and the bases are indicated at 18 while the converging walls are shown at 19. Said grooves, as shown in Fig. 4, extend transversely across the face 17 and they are formed or cut through the shoe at one side, as indicated at 20, which will be termed the open or assembling side of the shoe. At the remaining or closed groove side, the grooves are not cut or formed through end stock 21, affords a shoulder closing the grooves on this side.

By reference to Fig. 4, it will also be seen that the anchorage grooves convergingly taper from the open end 20 toward the closed end 21 of each.

Reference will next be made to the improved brake lining section equipped with the novel anchorage means for coacting with the anchorage means of the shoe.

In this form of the invention, the linings are in sections that are disposed in lateral abutting relation, as shown in Fig. 4, wherein three sections are illustrated although more or less may be within the invention. Said sections are indicated at 22, 23 and 24 and are alike in function and structure except for a slight difference in size of the anchorage portions thereof, hence, only one need be described in detail.

Each section, as will be seen from Fig. 6, is arcuate in form and comprises a braking face 25, and a base 26, and the section is arched to fit the shoe. This invention is addressed for use in connection with a brake lining that is cast and substantially rigid, and this type of lining is relatively less dense at and near the braking face 25, and relatively more dense near and at the base 26, which renders it particularly adaptable to my invention.

In accordance with this invention, the lining section 23 is provided with anchorage means which, as shown is in the form of bars 27, which project from the base 26 and are spaced in accordance with the spacing of the anchorage grooves in the shoe. The shape of the bars, as shown in Fig. 6, is transversely of the wedge type or dove-tailed to fit and coact with the dove-tailed grooves. Thus, it will be seen that when the parts are assembled, as shown in Fig. 3, the coacting male portions or bars, and the female portions or grooves, function not only to hold the lining against the shoe but prevent lengthwise displacement.

Because of the nature of the brake lining to which my invention is applied, namely, the fact that it has a hard dense base, it is a special feature both in reducing manufacturing cost and for structural and operative advantages, to cast the bars 27 integral with the base 26 of the brake lining, as shown in section in Fig. 14. By means of this feature, I not only provide a sturdy structure but also insure alining disposition of the bars with the grooves. While it is an advantage to make the grooves and bars of dove-tailed cross section, they may be made with rectangular faces, as shown at 28, in Fig. 15. It is also possible to make the anchorage bars separate, as shown at 29, in Fig. 16, and attach them by a rivet or like means 30, to the brake lining 31.

However, by casting the bars, or whatever form of anchorage portion is used, integral with the brake lining, I then avoid scoring the brake drum when the lining wears down, as it will be clear that as long as there is any lining on the shoe, the drum cannot be scored, as is frequently the case where the lining is riveted to the shoe. Further, when the riveted lining wears down and the ends of the rivets engage the brake drum, the driver is exposed to the great danger of ineffective brakage.

Because of the fact that the grooves are tapered and there is a plurality of sections, as shown in Fig. 4, it is necessary to provide section 22, with bars of a size and taper to fit the closed end portions of the grooves, while the bars 27 of sections 23 and 24, will have individual tapers correspondingly larger to fit those portions of the grooves relatively nearer the open ends of the grooves, as will now be clear.

Thus in making the assembly shown in Fig. 4, section 22 would first be laterally inserted to the position shown, and then successively, sections 23 and 24. By having the grooves and bars tapered, they are more easily inserted up to the point where the converging portions contact relatively tightly, and thereafter, pressure or impact may be necessary to get them into a final position. Conversely, in disassembly, once the sections are loosened from a final position, they are correspondingly more easily withdrawn, as will now be clear.

As a means of retaining the lining sections in position, I may employ short retaining strips or plates 32, which may be secured by screws 33, to the side of the shoe. The outer ends 34, may overlap the bars 27. Thus, no metal will project after the body of the lining has worn down. However, I do not wish to be limited to this particular retaining means.

Reverting now to Fig. 2, it will be seen that if the brake lining were anchored by rivets to the shoe, it would be necessary to remove the shoes, and because of the fact that the shoes are very wide and there is not enough clearance between the drum and vehicle spring, it would be necessary to remove the wheel of the vehicle in order to replace the lining. Likewise, if my improved anchorage involved a lining in a single section, the same partial disassembly would be necessary.

However, with my improved sectional lining, it is clearly possible to first remove the section 24, and then successively, sections 23 and 22, because the clearance afforded is sufficient for removal of these relatively narrow sections one at a time, and insertion of new sections, one at a time, without the disassembly usual under such circumstances.

It is not thought necessary to describe in detail how the dust shield 10 should be removed and other details of disassembly which are familiar to mechanics but it is important to note the fact that it is never necessary to remove the shoes, when the device of my invention is employed, in order to replace brake linings. Shoe removal is absolutely necessary for renewal of brake linings when the latter are riveted to the shoes. It may be suggested that in removing the brake lining sections, it is merely necessary to employ a tool having an L-shaped terminal that may be inserted between the lining and the face 9, so that the L-terminal may be hooked over the inside edge of the inner section. However, this will be obvious to a skilled mechanic and various expedients will appeal to his resource for this purpose.

Referring to Figs. 10 and 11, I have shown a shoe in all respects similar to that shown in Fig. 3, and which I will therefore designate with the same reference numerals including the anchoring grooves, the only difference being that the shoe shown in Figs. 10 and 11 is for a smaller size vehicle or truck. In this type, I employ a single brake lining section 35 which is of a width to extend entirely across the space afforded for the same. I have shown section 35 provided with anchorage bars 36, identical in form and function with bars 27, and like retaining means 37, is provided. The anchorage grooves are preferably tapered to facilitate removal of the section 35, laterally or to the right of Fig. 10, and it will be understood that this form of the invention will be employed where there is enough clearance for removal and insertion of brake linings without disassembly of truck parts. As the method of removing a worn lining and inserting a new lining, in this form, is practically the same as in the preferred form, no further description is necessary.

In Figs. 11 to 13, I have shown one form of touring car brake shoe which is of course of arcuate form but of T-cross section and the same is composed of a lining supporting flange 38 and a stiffening or rib flange 39. Flange 38 is too thin to afford sufficient stock for anchorage grooves and hence, I provide locking portions which may consist of bent up lugs 40, the lugs being formed from the stock of flange 38, as shown. The brake lining 41, is of rigid material but of course much thinner than that employed on trucks. This lining section will be cast to fit the shoe and when the ends are engaged by lugs 40, which only slightly project from flange 38, the lining 41 will be securely held in position as it will snugly fit between the lugs.

In this form of the invention, the lining may be withdrawn laterally off from the shoe without removing the latter or dismantling the car structure.

It is believed that the structure and advantages of my invention will be fully understood from the foregoing description, and while I have shown specific forms of the invention, I do not wish to be limited thereto except for such limitations as the claims may impart.

I claim:—

1. In a useful article of manufacture, an internal brake shoe, a rigid composite brake lining section for said shoe, said shoe having transversely disposed anchoring grooves opening at one side of said shoe and of dovetailed cross section and convergingly tapering toward that side opposite the opening side of said grooves, and said lining section having correspondingly shaped and sized tapering anchoring bars for lateral insertion into said grooves to anchor said section on said shoe against displacement from braking stress.

2. In a useful article of manufacture, an internal brake shoe having transversely disposed anchoring grooves of dove-tailed cross section and opening at one side of said shoe and tapering convergingly from the open side toward the remaining side of said shoe, and a rigid composite brake lining for said shoe composed of a series of relatively narrow width arcuate sections disposed in lateral abutting relation, and said sections having transversely disposed anchoring bars of dove-tail cross section and individually tapered for engagement with said grooves.

3. As a new and useful article of manufacture, an arcuate non-ferrous composite brake lining section of rigid material and having a radially outwardly disposed face for internal brakes, and said section having one or more anchoring bars projecting from the radially inner face thereof and said bars extending transversely of said section and tapering from one end of said bars to the other, and said integral section having an increasing density from its radially outer face to its radially inner extremities.

4. As a new and useful article of manufacture, a series of arcuate brake lining sections adapted to be disposed in lateral abutting relation to form a brake lining and the radially outer faces thereof constituting a braking face, the radially inner faces thereof being provided with shoe anchorage bars formed integral with said sections and being tapered, and the density of said sections increasing radially inwardly from their braking faces.

In witness whereof, I have hereunto set my hand.

BERT C. THORNBURGH.